Figure 1:
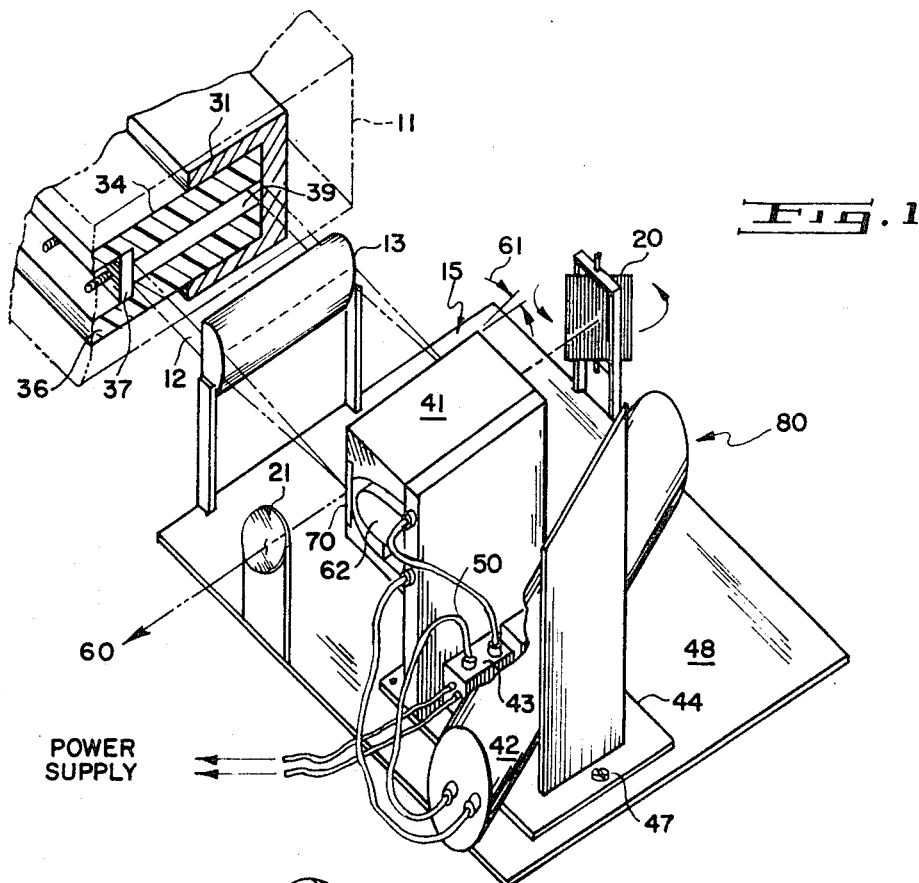

United States Patent
Caristi

[11] 3,745,484
[45] July 10, 1973

[54] FLOWING LIQUID LASER

[75] Inventor: Robert F. Caristi, Stoneham, Mass.

[73] Assignee: Avco Corporation, Cincinnati, Ohio

[22] Filed: Mar. 16, 1972

[21] Appl. No.: 235,216

[52] U.S. Cl.................. 331/94.5, 330/4.3, 356/246
[51] Int. Cl.............................................. H01s 3/20
[58] Field of Search................ 331/94.5; 330/4.3; 350/160; 356/246, 181

[56] References Cited
UNITED STATES PATENTS

| | | | |
|---|---|---|---|
| 3,663,891 | 5/1972 | Kocher | 331/94.5 |
| 3,684,979 | 8/1972 | Myer et al. | 331/94.5 |
| 3,675,990 | 7/1972 | Kogelnik et al. | 331/94.5 |

*Primary Examiner*—William L. Sikes
*Attorney*—Charles M. Hogan et al.

[57] ABSTRACT

Stimulated emission of radiation (laser action) is produced in materials generally classed as dyes. These dyes may be dissolved in a liquid solution. A quantity of dye in a flowing liquid solution in a module is pumped or excited by a laser beam radiating in the ultraviolet region which is focused to a line with a cylindrical lens. A rectangular beam of such radiation is produced by a pulsed cross field nitrogen gas laser. The focused line which is transverse to the beam produced by the exciting laser, and transverse to the direction of the flowing dye lies near the surface of the dye material in the working region of the module, and is substantially as long as the cell is wide. The module being an integral unit with a cell, reservoir, and circulating means attached, the working region of which lies within an intensifying optical cavity which may be formed by a 100% reflecting mirror and a 10% mirror both perpendicular to the line of focus of the pumping radiation. The stimulated emission from the dye material is characterized by a short pulse width and little loss of energy between the two lasers. High pulse rates with dye circulation, and high conversion efficiencies of the dye when so pumped, are obtained. For frequency adjustment the optical cavity substitutes for the 100% mirror a grating or Littrow prism at the appropriate angle. Further spectral narrowing is obtained by inserting a tilted Fabry-Perot etalon in the cavity. By using such a frequency tuner and a plurality of dye materials which emit stimulated radiation over different portions of the spectrum, the present device can provide laser radiation for virtually the whole visible spectrum and into the infrared and ultraviolet.

5 Claims, 2 Drawing Figures

PATENTED JUL 10 1973 3,745,484

FLOWING LIQUID LASER

BACKGROUND OF THE INVENTION

The field of this invention relates to the production of stimulated radiation in materials which are dyes or which have properties similar to those of dyes, and to methods and apparatus for producing such stimulated radiation.

It has been known for a number of years that stimulated emission can be produced in various organic liquids. The first such liquids were dyes, as reported by Sorokin et al., IBM Journal, Volume II, page 130, March 1967, and since that time devices which have been used to produce such stimulated radiation have been commonly known as "dye lasers" even though the materials emitting the radiation could not be classified as "dyes" in the true definition of the word. Some materials which fluoresce or scintillate outside the visible spectrum have been used, for example. A compendium of materials which have served as the active medium in dye lasers is given both in the above cited article of Sorokin et al, and in the review of Kagan et al., Laser Focus, page 26, September 1968. Because the term "dye laser" has become commonplace, it is used herein, but with the understanding that the active laser medium can be other than a dye.

The characteristics of dye lasers which make them attractive are the possibility of wide spectral range and tunability at low cost. One can operate the laser anywhere in the visible or into the ultraviolet or infrared simply by using a solution which emits in the desired spectral region in conjunction with an appropriate optical cavity. The cost of the material is minimal, certainly far less than the cost of a group of conventional lasers emitting at different wavelengths, and also less than the cost of frequency doublers and other such devices. The output wavelength of a dye laser also is tunable, either by varying the concentration of the solvent or by introducing a wavelength selective element such as a grating into the optical cavity to control the emission wavelength. Significant spectral narrowing without significant energy reduction is an additional benefit obtained with the use of a grating. Line widths less than 1 angstrom can be obtained in contrast to the 50–200 angstroms which are typical of dye laser emission.

Typical dye lasers used in an effort to obtain these characteristics have been pumped with Q-switched ruby or glass lasers, frequency doubled, or as in a few cases, pumping has been accomplished with flash lamps. Pumping has been either in a longitudinal geometry, in which the pumping radiation is colinear with the optical cavity axis and stimulated radiation, or in a transverse geometry with the excitation at right angles to this axis.

Dye lasers have thus far fallen short of achieving their full potential, however, because (1) a number of useful materials are difficult to pump due to low quantum efficiency or high excited state losses due to singlet-triplet transitions or to triplet absorptions, (2) low conversion efficiencies, high coupling energy losses, (3) low pulse repetition rates due to thermal effects induced during pumping, and (4) dye circulation problems and limitations. Therefore, the object of the present invention is to provide a dye laser capable to producing stimulated emission over a broad spectrum at high repetition rates, with frequency tuning, and which is an economical and practical device with high pumping efficiency and low energy coupling loss.

It is another object of the invention to provide apparatus for and a method of producing stimulated emission in a dye laser at high repetition rates with more efficient operation.

A further object of the invention is to provide a homogeneous flowing dye medium which will maintain good optical properties from pulse to pulse.

A still further object of the invention is to provide apparatus for allowing the dye solution to flow rapidly through the optical cavity in a nearly laminar or non-turbulent manner.

A still further object of the invention is to provide a self-contained flowing dye module comprising a cell, reservoir, and pumping system which may be easily removed and replaced for ease of operation and maintenance.

A still further object of the invention is to provide a flowing dye cell which substantially reduces the amount of undissolved contaminants from flowing through the active working region of the laser.

A still further object of the invention is to provide a bypass channel in the flowing dye cell in order to eliminate air pockets or bubbles and thereby prevent them from flowing through the working region of the laser.

According to the invention these objects are achieved in a dye laser which has a laser pump emitting a pulsed rectangular beam of exciting or pumping radiation, which beam is focused to a line by a cylindrical lens or mirror. The focus line of pumping radiation is directed to lie within a segregated quantity or working region of lasing material, which can be an organic dye or similar material. Optical cavity means to intensify stimulated radiation emitted along the focused line are provided with a reflecting axis perpendicular to the pumping radiation. The optical cavity means includes wavelength selective means such as a grating to tune the output frequency. In preferred embodiment, the laser pump is a crossed field gas laser, more particularly a nitrogen gas laser emitting at 3,371 angstroms, the dye cell is substantially as wide as the focused line of pumping radiation and the focused line of pumping radiation is positioned near the inner surface of the working region of the cell. The dye cell is of a U-shaped hydrodynamic design which provides a substantially laminar dye solution following through the working region located at the bight. Further, the cell is designed to prevent undissolved particles and air pockets to pass through the working region which would cause deleterious effects. Further, the cell is an integral part of the module which is an integrated plug-in type comprising a cell, liquid pump, and reservoir for ease of operation and maintenance.

Figure 2:
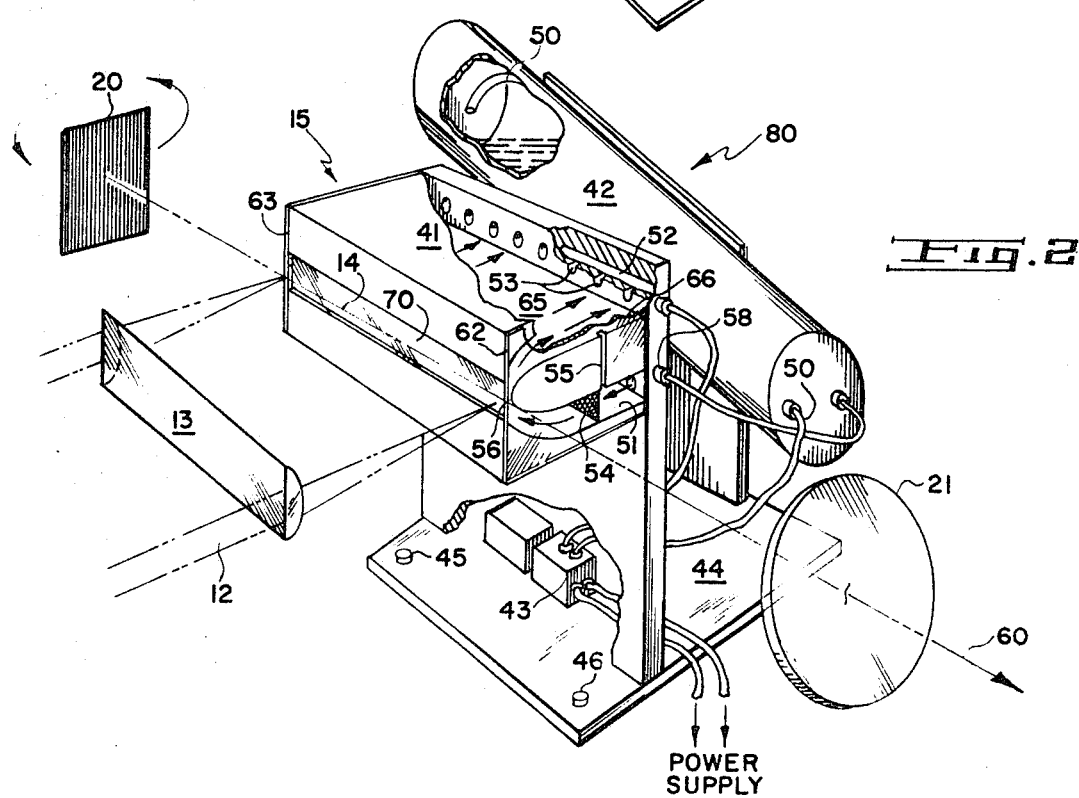

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIG. 1 is a perspective view with parts broken away of apparatus in accordance with the invention; and FIG. 2 is a detailed expanded perspective view with parts broken away of a portion of apparatus illustrated in FIG. 1.

Attention is now directed to FIGS. 1 and 2 which illustrate a preferred embodiment of the invention. A pumping laser 11 emits a rectangular beam 12 of coherent, collimated pumping radiation in pulse form. The rectangular beam 12 is converged in one dimension as shown by a cylindrical lens 13 and is focused to a line 14 of pumping radiation which is at right angles to the direction of beam 12. The working region of the cell, approximately as wide as the line 14, is positioned so that the line 14 lies within it to bring about the excitation to higher energy levels and the necessary population inversion for stimulated emission to occur in the laser material. A simple optical cavity for intensification of stimulated radiation in the laser material is formed by a conventional grating 20 and a 10% planar mirror 21, both of which are perpendicular to line 14. The stimulated radiation, at a wavelength determined by the laser material in the dye module and the grating passes through the mirror 21 as the output beam 60 of the dye laser.

PUMPING LASER

The source of pumping radiation in the present invention is the pumping laser 11 which preferably is a pulsed cross field gas laser either using nitrogen ($N_2$) as the discharge gas and emitting at 3,371 angstroms in the ultraviolet or using neon as the discharge gas and emitting at 5,401 angstroms in the green. A suitable example of such a laser is that invented by R. Caristi, et al. described in U.S. Pat. No. 3,633,127, issued Jan. 4, 1972. A commercial version of this laser is the Avco Model C5000 pulsed gas laser.

The pumping laser 11 of the above type, as described more fully in the above U.S. patent, is constructed with a U-shaped aluminum base electrode 31, two spaced Lucite side walls 34 and 36 facing each other within the base electrode, and an aluminum electrode 37 carried by the side walls 34 and 36. Through the rectangular duct 39 formed between electrodes 31 and 37 between side walls 34 and 36, a supply of gas is flowed at appropriate pressure, and a pulsed electric field is applied across electrodes 31 and 37 to cause the pulsed rectangular laser beam 12 to be emitted. For purpose of the present invention the gas flowed through duct 39 is preferably nitrogen, which produces radiation at 3,371 angstroms in the ultraviolet for efficient pumping of most laser materials in the dye cell 15, but it can also be neon, which emits at 5,401 angstroms in the green and is suitable for pumping of some materials, specifically materials which emit in the near infrared. Further details of operation of pumping laser 11 appear in the patent mentioned above. The following table summarizes typical performance characteristics of the pumping laser 11 of the above type, employing nitrogen as the discharge gas.

Nitrogen Pumping Laser Characteristics

| | |
|---|---|
| Output wavelength | $\lambda = 3371 A$ |
| Bandwidth | $\Delta\lambda = 1 A$ |
| Peak output power | 100kW |
| Effective pulse widths | 10 nanoseconds |
| Energy per pulse | 0.001 joules |
| Output beam dimension | ⅛" × 2" |
| Pulse repetition rate | 0 to 500 pps |

The high peak power and rapid pulse rise time, as well as the high possible repetition rate, all contribute to the excellent results of use of such a device as a source of pumping radiation.

Further focusing aspects of the pumping arrangement are shown in FIG. 1. FIG. 1 illustrates how the parallel waves of the rectangular beam 12 are converged into the line 14 by the cylindrical lens 13. The position of the line of focus 14 within the working region dye cell 15 can be varied to suit the material in the dye cell 15. For materials which lase only with difficulty due to low quantum efficiency or excited state losses, highly concentrated pumping energy is desirable. Because many of these laser materials in the dye cell 15 that are difficult to excite have a short absorption length in the concentrations which produce optimum power, it has been found preferable for these materials to locate the focus line 14 near the surface of the laser material so there will be little absorption loss to reduce the intense concentration of pumping energy potentially available at focus line 14. Typical distances between the line 14 and the surface of such lasing materials have been on the order of a few hundredths to a few tenths of a millimeter. For materials which lase readily, highly concentrated pumping energy may produce the undesirable condition of super-radiance, in which radiation is emitted uncontrolled by the optical cavity. For such materials the focus line 14 is located further from the surface of the material so that the energy concentration in the active medium is reduced by an increase in lasing volume.

DYE MODULE

Attention is directed to FIGS. 1 and 2 which illustrate the construction of dye module 80. The dye module 80 is designed to hold and circulate a liquid laser material and comprises a rectangular cell container generally designated 41, a reservoir 42, and a circulating liquid pump 43. The components, container 41, reservoir 42, and pump 43 are fixedly mounted on plate 44. Plate 44 is provided with two positioning pins 45 and 46 and quick release bolt 47 for positioning and attaching the dye module on to the supporting structure 48. The module may be positioned in the proper relation to the optical cavity and laser pumping means by attaching plate 44 to structure 48. This design allows the dye module 80 to be easily inserted into the system and facilitates operation and maintenance. For example if another dye solution is desired, the whole dye module may be readily detached by merely turning bolt 47, removed, and replaced by another module which is positioned by pins 45 and 46 that are permanently affixed to structure 48. Thus, it is similar to the operation of removing and replacing a "cassette" in a tape recorder.

In operation the liquid dye solution is drawn from container 41 by pump 43 and pumped into the tilted elevated reservoir 42. The dye solution is introduced into the reservoir 42 from above the surface of the solution by a fill tube 50 positioned inside the reservoir. The fill tube is positioned in such a manner as to introduce the solution along the lower side of the inclined reservoir. The solution is introduced in such a manner to avoid the froth or bubbles much like avoiding foam when beer is poured into a tilted glass. The reservoir 42 is elevated in order to provide a gravity assist when the dye solution is introduced to the inlet manifold 58 of container 41. Both inlet and outlet manifolds (58 and 66 respectively) comprise a cylindrical channel 52 which receives and stores a quantity of the dye solution. Along one side of the channel 52 is arranged a number of small passages which in actual practice, due to the pressure provided by the pump 43, function like nozzles, collectively identified by the numeral 53. In operation, the inlet manifold 58 receives the solution from the reservoir 42 and supplies the solution to the inlet duct 51 through the nozzles 53. This arrangement breaks up the flow into a number of small jet streams emerging from each of the nozzles in order to minimize turbulence and thereby reduce bubble production. After the solution enters the rectangular U-shaped flow channel through inlet duct 51, it passes through a screen or reticulated structure to further smooth the flow as well as remove solid undissolved particles and restrict the flow or air bubbles through the system. An escape slot 55 is provided to allow the bubbles which have accumulated at the elevated side of the flow channel to escape without circulating through the working region 56. The cross section of the flow channel is reduced at the working region 56 of the cell located at the bight of the U-shaped channel. At the working region 56 the flow velocity should be maximum and the motion nearly laminar. This region should also be free from any bubbles or solid particles which would interfere with the lasing action. As previously mentioned, the pumping laser 11 is focused to a line 14 in the working region 56 in order to create the population inversion within the dye solution. The focused pumping or exciting laser beam 12 is introduced through the front window 70 substantially transverse to the flow direction as well as transverse to the dye laser output beam 60. In order to minimize the effects of output windows 62 and 63 on the optical cavity, the whole module is canted at an angle 61 which is only a few degrees. This canting angle is effective to tilt the plane of the windows 62 and 63 in order to form an obtuse angle between the output window and the output beam 60.

After the dye solution passes through the working region 56, the dye solution then passes through the outlet flow duct 65, and outlet manifold 66. The dye solution is then drawn out of the exit manifold 66 of the container 41 by a pump 43, pumped into the reservoir 42, and returned to the container 41 through inlet manifold 58 to complete the cycle. The cycle may be repeated until the dye solution breaks down. The repetition rate is increased because the solution is continually being circulated providing a fresh amount of dye solution within the working region. This fresh solution is capable of being excited and is free from any residual stored energy (such as heat or populated energy states) which the previously excited segment of the dye solution would contain.

OPTICAL CAVITY

The radiation stimulated in the laser material in the working region of the dye module is intensified by an optical cavity having its reflecting axis parallel to line 14 and transverse to the direction of the pumping beam 12. As mentioned above and as shown in FIG. 1, the optical cavity can be comprised of a grating 20 and a partially reflective mirror 21 or alternatively may be comprised of two mirrors, one of which is 100% reflecting for greatest intensification (replacing the reflective grating), and the other of which is partially transmitting (e.g. 10% reflecting) to permit output beam 60 if stimulated radiation to exit from the device.

As shown in FIG. 1, the grating reflector 20 may be rotated and thereby used to provide wavelength tuning. The criteria to be followed in selecting the properties of grating 20 will depend to some extent on the use to which the output beam 60 is to be put, but it is generally desirable to select a grating which is efficient at the wavelengths of interest and with blaze selected for highest energy, and with high resolution and dispersion to produce an output of greatest monochromaticity. The relationships of groove spacing and number, and blaze, to produce these results are well known and need not be repeated here. Tuning is achieved, as is well known, by varying the angle of the grating until the desired wavelength is obtained. Other wavelength selective elements, for example a Littrow prism, can also be substituted for grating 20.

For further spectral narrowing a transmission filter (not shown) can be inserted in the optical cavity. In such a situation the use of a Fabry-Perot etalon is positioned at an appropriate angle to the cavity axis to pass radiation of the desired frequency. The tilted partially reflecting inner surfaces of this etalon form a resonant cavity which provides spectral narrowing to a high degree, and line widths on the order of 0.01 angstroms in output beam are obtainable with such a device. Furthermore the grating in the optical cavity can be replaced with a concave mirror if an increase in cavity stability is desired. Further the grating can also be replaced with a convex mirror to form an unstable cavity which will help to suppress any unwanted modes.

OPERATION AND RESULTS

The dye laser arranged as described above has been tested with a variety of laser materials. It was found that high conversion efficiencies could be obtained. Moreover, the extremely short pulse widths and the fast repetition rate with the use of dye circulation which were obtained are two unique and valuable features of the present scheme. Use of a diffraction grating instead of a 100% reflecting mirror for one end of the optical cavity permitted the laser wavelength to be tuned and also permitted the effective wavelength range of each dye to be extended. Tuning of the radiation to a narrow band width resulted in no apparent loss of efficiencies at the wavelengths of the natural fluorescence, but there was observed a definite variation of efficiency with wavelength. Efficiency is also a function of concentration of the dye, and the output spectral distribution is also a function of concentration. The rapid pulse rate with little loss in efficiency which is obtainable in the present invention indicates that the recovery of the dyes is fast when pumped in the manner described above.

Typical test results using the dye laser of the present invention are summarized in the table below. The concentrations of the various dyes were selected for maximum conversion efficiency, the concentrations generally being on the order of $10^{-3}$ to $10^{-4}$ moles/per litre. Conversion efficiency given in the table is the ratio of the dye energy to the nitrogen laser energy, i.e. the energy of the dye laser pulses divided by the energy of the nitrogen laser pulses.

TYPICAL CHARACTERISTICS OF FLOWING DYE LASER EXCITED BY PULSED NITROGEN LASER (3371 ANGSTROMS)

| Dye/Solvent | Tunable Range (A) | Pulse Energy* (Microjoules) | Conversion Efficiency* (Percent) | Pulse Width (Nsec) |
| --- | --- | --- | --- | --- |
| PBD/ butyl alcohol | 3550–3860 | 47 | 4.7 | 5 |

| Dye/Solvent | Range (Å) | | | |
|---|---|---|---|---|
| Alpha-NND/butyl alcohol | 3850–4110 | 10 | 1.0 | 4 |
| POPOP/butyl alcohol | 3990–4500 | 29 | 2.9 | 6 |
| 4 Methyl Coumarin/ethyl alcohol | 4370–4900 | 110 | 11.0 | 8 |
| 3 Amino Phthalimide/ethyl alcohol | 4840–5150 | 24 | 2.4 | 2 |
| Brilliant Sulphaflavine/ethyl alcohol | 5110–5490 | 14 | 1.4 | 2 |
| Fluorescein/ethyl alcohol | 5440–5870 | 67 | 6.7 | 5 |
| Rhodamine 6G/ethyl alcohol | 5750–6220 | 39 | 3.9 | 5 |
| Rhodamine B & Rhodamine 6G/ethyl alcohol | 6030–6500 | 19 | 1.9 | 5 |
| Cresyl Violet & Rhodamine 6G/ethyl alcohol | 6440–6750 | 7.7 | 0.77 | 2 |

All Data at 500 pps with 1 Millijoule input at 3371 Angstroms
Dye Flow Rate 200 cc per minute
*At Mid-Band As the above table makes clear, the present dye laser combines high efficiency with short pulse widths and rapid pulse rates to make this a very valuable method of stimulating radiation in dyes. By providing a variety of different dyes in different interchangeable dye modules, it can be appreciated that the present dye laser will permit a broad spectral range to be covered at high efficiencies simply by replacing dye modules and by making simple adjustments in the grating.

The various features and advantages of the invention are thought to be clear from the foregoing description. Various other features and advantages not specifically enumerated will undoubtedly occur to thos versed in the art as likewise will many variations and modifications of the preferred embodiment illustrated, all of which may be achieved without departing from the spirit and scope of the invention defined by the following claims.

What is claimed is:

1. Apparatus for producing stimulated radiation in a flowing liquid laser material comprising:
   a. pumping laser means emitting a rectangular beam of pumping radiation;
   b. focusing means positioned to focus said rectangular beam substantially to a line;
   c. container means including means defining a U-shaped channel having a restricted portion at its bight for providing substantially laminar flow of said laser material through a restricted area, said restricted portion defining the working region wherein the flow velocity is increased, said container having a front window through which said focused beam passes and said container being positioned such that said line of focus is substantially transverse to said flow direction and is located within said working region, said container additionally having two side windows through which the stimulated emission produced in the working region may pass, said container means including an inlet manifold and substantially rectangular inlet duct means through which said liquid laser material flows to said working region, and an outlet manifold and substantially rectangular outlet duct means through which said liquid laser material flows after leaving said working region, said manifold means each having a chamber portion and having a plurality of passages spaced along the length of said chamber portion providing communication between the interior of respectively said inlet and outlet chamber portions and said inlet and outlet duct means, whereby said laser material flow is substantially laminar on entering and leaving said working region;
   d. liquid pumping means circulating said liquid laser material through said container; and
   e. optical cavity means spaced from said container for intensifying stimulated radiation emitted from said liquid laser material substantially along said line of focus, and optical cavity means having a reflecting axis substantially coincident with said line of focus of pumping radiation.

2. Apparatus according to claim 1 wherein said liquid pumping means includes a reservoir disposed at least in part above said container means to hydrostatically assist said flow.

3. Apparatus according to claim 2 wherein said reservoir is tilted at an angle, said reservoir being filled from said container means through a fill tube positioned so as to introduce said laser material along the lower inner inclined surface of said reservoir.

4. Apparatus according to claim 1 wherein said inlet duct means is located below said outlet duct means and said inlet duct means includes a reticulated structure positioned transverse to said flow direction and substantially covering the cross sectional area of said inlet duct, whereby said laser material passes through said reticulated structure and is filtered prior to entering said working region.

5. Apparatus according to claim 4 wherein said duct means includes a slot upstream and adjacent said reticulated structure, said slot interconnecting said inlet and outlet duct to provide a relief passage for air bubbles trapped by said reticulated structure.

* * * * *